(12) United States Patent
Kusaka (10) Patent No.: US 6,523,077 B1
(45) Date of Patent: Feb. 18, 2003

(54) DATA PROCESSING APPARATUS AND DATA PROCESSING METHOD ACCESSING A PLURALITY OF MEMORIES IN PARALLEL

(75) Inventor: Tamotsu Kusaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/481,865

(22) Filed: Jan. 12, 2000

(30) Foreign Application Priority Data

Jan. 14, 1999 (JP) .......................................... 11-007557

(51) Int. Cl.$^7$ ............................................... G06F 13/14
(52) U.S. Cl. ...................... 710/126; 710/56; 710/129; 711/112; 711/105
(58) Field of Search .................. 710/126, 56, 129; 711/112, 105

(56) References Cited

U.S. PATENT DOCUMENTS

| | | | | |
|---|---|---|---|---|
| 5,586,264 A | * | 12/1996 | Belknap et al. | ......... 395/200.08 |
| 5,687,393 A | | 11/1997 | Brown et al. | ............... 395/849 |
| 5,805,821 A | * | 9/1998 | Saxena et al. | .............. 709/231 |
| 5,911,149 A | | 6/1999 | Luan et al. | |
| 5,943,287 A | * | 8/1999 | Walton | .................. 365/230.03 |
| 6,389,494 B1 | * | 5/2002 | Walton et al. | .............. 710/126 |

FOREIGN PATENT DOCUMENTS

| | | |
|---|---|---|
| JP | 62-169851 U | 10/1987 |
| JP | 63-071760 A | 4/1988 |
| JP | 3-163671 | 7/1991 |
| JP | 3-176754 | 7/1991 |
| JP | 5-233521 A | 9/1993 |
| JP | 6-195313 | 7/1994 |
| JP | 8-335204 | 12/1996 |
| JP | 9-223103 | 8/1997 |
| JP | 10-133941 A | 5/1998 |

* cited by examiner

Primary Examiner—Jeffrey Gaffin
Assistant Examiner—Abdelmoniem Elamin
(74) Attorney, Agent, or Firm—Foley & Lardner

(57) ABSTRACT

A data processing apparatus according to the invention is provided with a plurality of processors, a plurality of memories, a plurality of memory bus selectors each corresponding to a memory, and a control circuit. Each of the plurality of memories can be accessed by any of the plurality of processors through its corresponding memory bus selector. The control circuit establishes access routes between the plurality of memories and the plurality of processors by providing control signals to the memory bus selectors based on a requests from the processors.

15 Claims, 6 Drawing Sheets

| CPU31 | CPU32 | M-BUS SECT35 | M-BUS SECT36 | M-BUS SECT37 | M-BUS SECT38 |
|---|---|---|---|---|---|
| MEM39→MEM40 |  | SB34A | SB34A | SB34A | SB34A |
| MEM39→MEM42 | MEM40→MEM41 | SB34B | SB34B | SB34A | SB34A |
| MEM41→MEM39 | MEM42→MEM43 | SB34A | SB34A | SB34B | SB34B |
| MEM39→MEM40 |  | SB34A | SB34A | SB34A | SB34A |
| MEM39→MEM42 | MEM40→MEM41 | SB34B | SB34B | SB34A | SB34A |
| MEM41→MEM39 | MEM42→MEM43 | SB34A | SB34A | SB34B | SB34B |
| MEM39→MEM40 |  | SB34A | SB34A | SB34A | SB34A |
| MEM39→MEM42 | MEM40→MEM41 | SB34B | SB34B | SB34A | SB34A |
| MEM41→MEM39 | MEM42→MEM43 | SB34A | SB34A | SB34B | SB34B |
| ⋮ | ⋮ |  |  |  |  |

DATA PROCESSING APPARATUS AND DATA PROCESSING METHOD ACCESSING A PLURALITY OF MEMORIES IN PARALLEL

BACKGROUND OF THE INVENTION

1. Field of the Invention

The present invention relates to a data processing apparatus and a data processing method for accessing a plurality of memories in parallel. The memories are used for storing data such as an image data and the like.

2. Description of the Related Art

A data processing apparatus using a data transfer bus is noted in Japanese Laid Open Patent Applications JPA-Heisei 3-163671, JP-A-Heisei 3-176754, JP-A-Heisei 6-195313, JP-A-Heisei 8-335204 and 3P-A-Heisei 9-223103. A data processing apparatus using a DMA controller is noted in Japanese Laid Open Patent Application JP-A-Heisei 9-223103. In this data processing apparatus, when a CPU accesses a memory, the DMA controller is set at a bus waiting state. In this data processing apparatus, when the DMA controller executes a DMA transfer, the CPU is set at the bus waiting state.

A data processing apparatus having a bus arbitration circuit is noted in Japanese Laid Open Patent Application JP-A-Heisei 9-223103. This bus arbitration circuit uses a plurality of system buses to accordingly arbitrate a right of using a bus. This bus arbitration circuit, when a bus request signal indicative of a request to use a system bus is generated, outputs a response signal corresponding to the bus request signal that serves as a bus grant signal. The right of using the bus is arbitrated based on the bus grant signal.

SUMMARY OF THE INVENTION

An object of the present invention is to provide a data processing apparatus and a data processing method which can reduce an occurrence of a bus open waiting state to thereby improve data processing speed.

Another object of the present invention is to provide a data processing apparatus and a data processing method in which a plurality of CPUs, each accessing a memory, can mutually recognize data updates in the memories.

In order to achieve an aspect of the present invention, a data processing apparatus is provided with a plurality of processors, a plurality of memories, a memory bus selector and a control unit. The plurality of memories are accessed by the plurality of processors. The memory bus selector selects an access route between one of the plurality of processors and one of the plurality of memories. The control unit instructs the access routes to the memory bus selector based on a transfer request from the plurality of processors.

In the above, a data processing apparatus is provided with a plurality of system buses which connect the plurality of processors to each memory bus selector, respectively. The memory bus selector selects the access route based on an instruction from the control unit.

In the above, a data processing apparatus is provided with a parallel input-output unit connecting the plurality of processors and the control unit in parallel.

In the above, a data processing apparatus is provided with a serial interface unit connecting the plurality of processors and the control unit in serial.

In order to achieve an aspect of the present invention, a data processing apparatus is provided with a processor, a memory control unit, a plurality of memories and a plurality of memory bus selectors. The plurality of memories is accessed by the processors and the memory control unit. The memory bus selector selects an access route between the processors and one of the plurality of memories and between one of the memory control unit and one of the plurality of memories. The memory control unit instructs the access routes to the memory bus selector based on a request of the processors.

In the above, a data processing apparatus is provided with a plurality of system buses which connect the processors and the memory control unit to the memory bus selector. The memory bus selector selects the connection based on an instruction from the memory control unit.

In order to achieve an aspect of the present invention, a data processing apparatus is provided with a first and second system buses, a processor connected to the first system bus, a memory control unit connected to the processor, a plurality of memories, a plurality of memory bus selectors and a memory control unit. Each of the memory bus selectors is connected to the first and second system buses and a corresponding one of the plurality of memories and connects the corresponding memory to one of the first and second system buses in response to an instruction. The memory control unit generates a first instruction to a first one of the memory bus selectors in response to a first request from the processor such that the first memory bus selector selects the first system bus to allow the processor to access one of the plurality of memories corresponding to the first memory bus selector.

In the above, the memory control unit generates second and third instructions to the second and third memories of memory bus selectors in response to second and third requests from the processor. In response to the second and third instructions, the memory control unit reads data from the second memory via the second memory bus selector and the second memory bus and the memory control unit stores the data to the third memory via the third memory bus selector and the third memory bus.

In the above, a data processing apparatus is provided with a buffer.

In the above, the memory control unit generates the second and third instructions to the second and third memories of memory bus selectors in response to the second and third requests from the processor such that the memory control unit transfers data from the second memory to the buffer via the second memory bus selector and the second memory bus and the memory control unit transfers the data from the buffer to the third memory via the third memory bus selector and the third memory bus.

In order to achieve an aspect of the present invention, a method of accessing a plurality of memories selects a system bus between one of the plurality of processors and one of the plurality of memories. Furthermore, the method transfers data between the processor and the memory via the selected system bus.

DESCRIPTION OF THE PREFERRED EMBODIMENTS

A first embodiment of the present invention will be described below in detail with reference to FIGS. 1 and 2.

Figure 1:
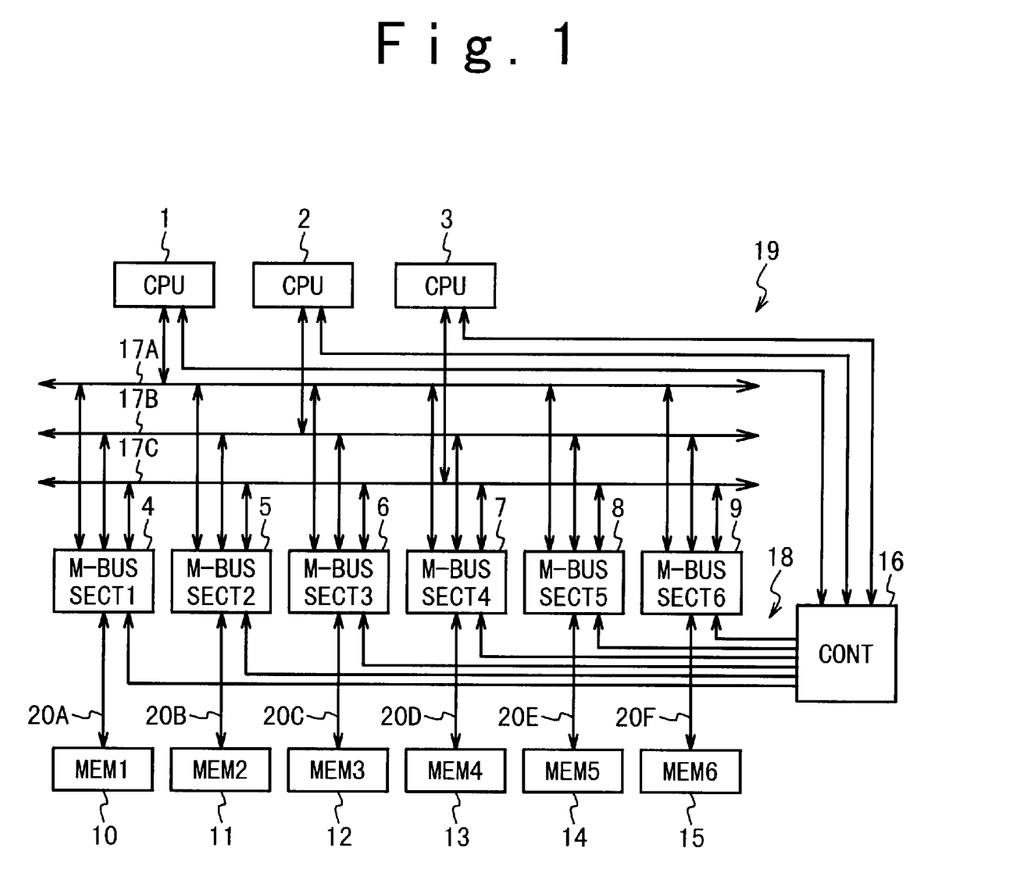
FIG. 1 is a block diagram showing a data processing apparatus as a first embodiment of the present invention.

As shown in FIG. 1, a data processing apparatus according to the present invention is provided with: three CPUs 1 to 3; six memory bus selectors 4 to 9; six memories 10 to 15; a control circuit 16; and three system buses 17A to 17C.

Each CPU 1 to 3 is respectively connected to one of the system buses 17A to 17C. Each memory bus selector 4 to 9 is connected to all of the system buses 17A to 17C. Each of the memories 10 to 15 is respectively connected through one of memory buses 20A to 20F to a corresponding memory bus selector 4 to 9. The control circuit 16 is connected through communication buses 18 to each memory bus selector 4 to 9. The control circuit 16 is also connected through communication buses 19 to each CPU 1 to 3.

Figure 2:
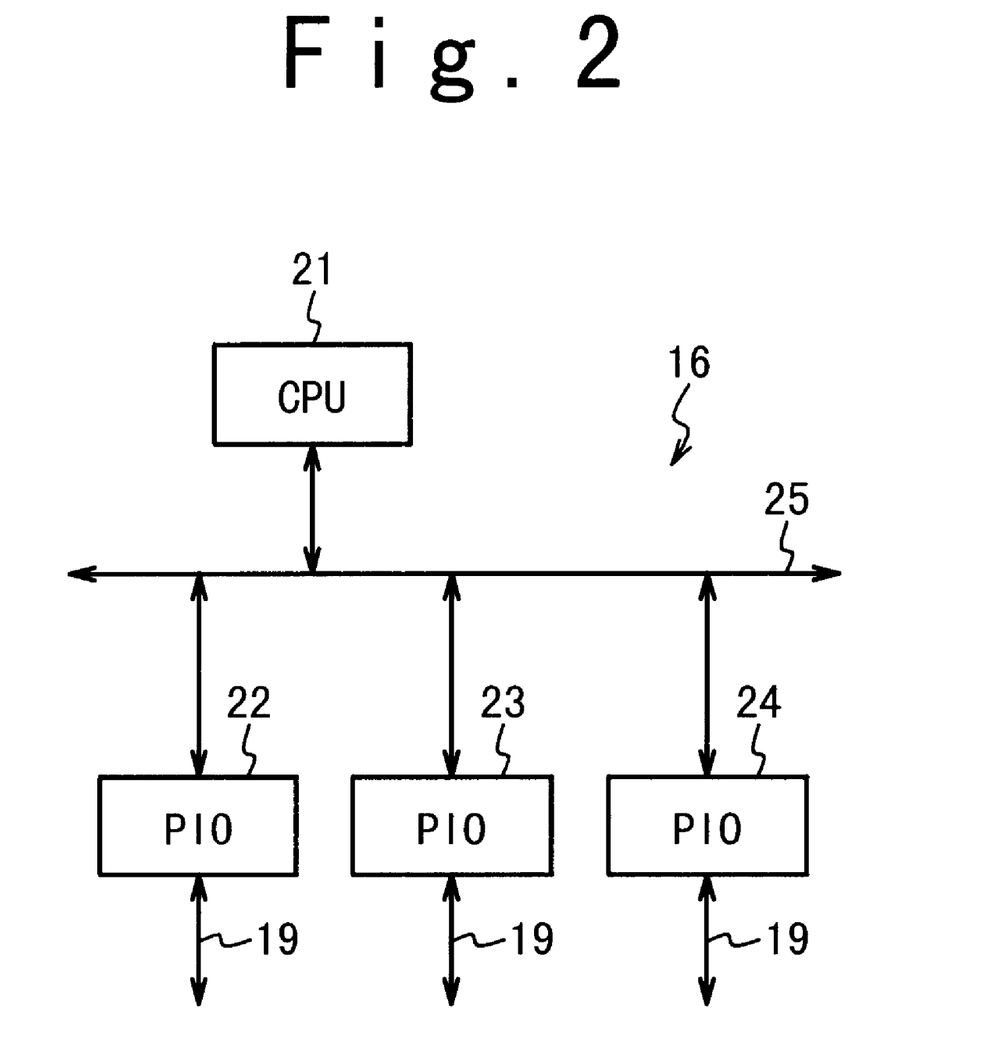
FIG. 2 is a block diagram showing a control circuit of the data processing apparatus in FIG. 1.

As show in FIG. 2, the control circuit 16 is provided with a CPU 21 and parallel input and output devices 22 to 24.

The CPU 21 is connected through a system bus 25 to each of the parallel input and output devices 22 to 24. Each parallel input and output device 22 to 24 is respectively connected through the communication buses 19 to one of the CPUs 1 to 3. The operations of parallel sending and receiving data are executed through the parallel input and output devices 22 to 24 between the CPU 21 of the control circuit 16 and the CPUs 1 to 3. The control circuit 16 controls connection of the memories 10 to 15 to the system buses 17A to 17C. The connections are established in accordance with control signals outputted to the memory bus selectors 4 to 9 from the control circuit 16. The memory bus selectors 4 to 9 respectively connect their corresponding memories 10 to 15 to the system buses 17A to 17C, in accordance with selection signals. The CPUs 1 to 3 can respectively execute parallel accesses of the memories 10 to 15. The CPUs 1 to 3 can execute reading from and writing to the memories 10 to 15 in parallel.

The data transfers are executed through the communication buses 19 between the CPU 21 in the control circuit 16 and the CPUs 1 to 3. The CPUs 1, 2, 3 and 21 generate a plurality of selection signals, in accordance with preset data processing flow. The selection signals are outputted to the memory bus selectors 4 to 9. CPUs within the memory bus selectors 4 to 9 respectively specify connection of the corresponding memory 10 to 15 to one of the system buses 17A to 17C. The CPUs within the memory bus selectors 4 to 9 can specify the access conditions (the data processing states) of the memories 10 to 15. The CPUs 1 to 3 communicate with each other, and then send and receive the information with regard to the data processing states to and from each other. The CPUs 1 to 3, after checking the data processing states of the memories 10 to 15, execute next data processing (memory access). Incidentally, the control circuit 16 may be constituted only by the CPU 21. The control circuit 16 may be constituted by other circuits, such as logical circuits and the like, other than CPUs.

A second embodiment in the present invention will be described below in detail with reference to FIGS. 3 to 6.

Figure 3:
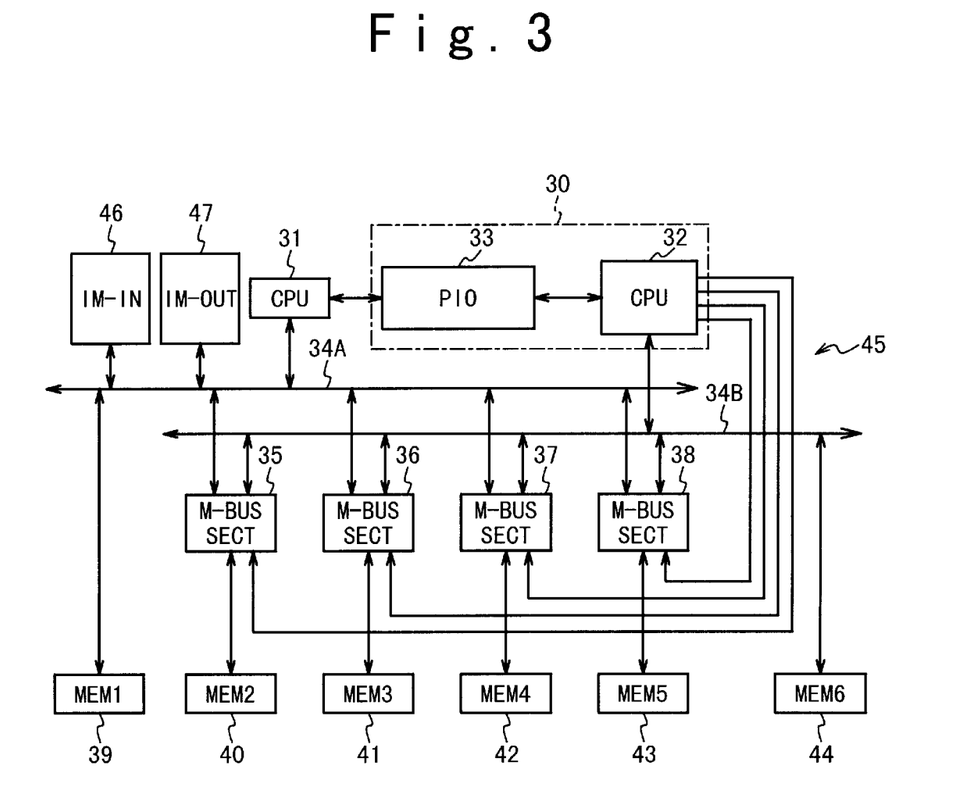
FIG. 3 is a block diagram showing a data processing apparatus as a second embodiment of the present invention.

As shown in FIG. 3, a data processing apparatus according to the present invention is provided with: two CPUs 31, 32; a parallel input and output device 33; four memory bus selectors 35 to 38; six memories 39 to 44; and two system buses 34A, 343.

The CPU 32 and the parallel input and output device 33 constitutes a control circuit 30. The control circuit 30 may be constituted only by the CPU 32.

The CPU 31 and the CPU 32 are connected to each other through the parallel input and output device 33. The CPUs 31, 32 are respectively connected to the system buses 34A, 34B. The CPU 31 and the memory 39 are connected to the system bus 34A. The connections are always set at an active state. The CPU 31 can always access the memory 39. The CPU 32 and the memory 44 are connected to the system bus 343. The connections are always set at the active state.

The CPU 32 can always access the memory 44. The memory bus selectors 35 to 38 are connected to the system buses 34A, 34B. The memories 40 to 43 are respectively connected through memory buses to the memory bus selectors 35 to 38. The CPU 32 is connected through communication buses 45 to the memory bus selectors 35 to 38.

The CPU 32 sets the connections between the memories 40 to 43 and the system buses 34A, 34B at the active state. The settings are executed in accordance with a plurality of selection signals outputted to the memory bus selectors 35 to 38 from the CPU 32. The memory bus selectors 35 to 38 respectively set the connections between the memories 40 to 43 and the system buses 34A, 34B at the active state, in accordance with the selection signals. The CPU 31 can always access the memory 39. The CPU 31 can set the connections between the CPU 31 and the memories 40 to 43 at the active state. The CPU 31 can sequentially access the memories 40 to 43. The CPU 32 can always access the memory 44. The CPU 32 can set the connections between the CPU 32 and the memories 40 to 43 at the active state. The CPU 32 can sequentially access the memories 40 to 43. The CPUs 31, 32 can respectively execute parallel accesses of the memories 40 to 43. The CPUs 31, 32 can execute reading from and writing to the memories 40 to 43 in parallel.

The CPU 31 is connected through the system bus 34A to an image input device 46 and an image output device 47.

The CPU 31 writes to the memory 39 an image data outputted by the image input device 46. The CPU 31 reads out a stored image data from the memory 39, and outputs to the image output device 47. When the CPU 31 writes the image data to the memory 39, the CPU 32 performs the image processing on the image data stored in the memory 39. The image processing may be executed by the CPU 31. The execution of the image processing by the CPU 32 enables a load on the system bus 34A to be reduced and also enables a speed of a process to be made faster.

The CPU 31 checks the active state of the connection between the memory 40 and the system bus 34A. The check is executed in accordance with a command transferred to the CPU 32 through the parallel input and output device 33 from the CPU 31. The CPU 32 receiving this command transmits a status back to the CPU 31. The CPU 31 recognizes a selection logic of the selection signal of the communication bus 45, on the basis of the status.

The CPU 31, when recognizing the active state of the connection between the memory 40 and the system bus 34A, transfers the image data stored in the memory 39, through the system bus 34A to the memory 40. The CPU 31, when the transfer is completed, reports the completion of the data transfer to the CPU 32. The reporting operation is executed through the parallel input and output device 33. The CPU 32 sets the connections between the memories 40, 41 and the system bus 343 at the active state. The settings are executed in accordance with the selection signals transferred to the memory bus selectors 35, 36 from the CPU 32. The CPU 32, when recognizing the active state of the connections between the memories 40, 41 and the system bus 343, reads the image data stored in the memory 40, through the system bus 34B. The CPU 32 performs the image processing on the read image data. The CPU 32 writes the image data after the image process, through the system bus 34B to the memory 41. In parallel with the execution of the image process on the CPU 32, the CPU 31 transfers the image data to be image-processed, from the memory 39 through the system bus 34A to the memory 42.

The CPU 32, when the image process is completed, transfers an image process completion status signal through the parallel input and output device 33 to the CPU 31. The CPU 32 transmits the selection signals indicative of a request to set the connections between the memories 40, 41 and the system bus 34A at the active state, to the memory bus selectors 35, 36. The CPU 31, when receiving the image process completion status signal, transfers the image data after the image process stored in the memory 41, through the system bus 34A to the memory 39. In parallel with this transfer, the CPU 31 transfers a further image data to be image-processed, from the memory 39 to the memory 40. The CPU 31, when the operation of transferring the image data to the memory 42 from the memory 39 is completed, transmits an image transfer completion command through the parallel input and output device 33 to the CPU 32. When this command is transmitted, the connections between the memories 42, 43 and the system bus 34B are set at the active state. When the setting is executed, the CPU 32 reads out the image data from the memory 42, and performs the image processing on the image data. Then, the CPU 32 writes the image data after the image process, to the memory 43.

The transfer control of the image data of the CPU 31 and the image processing on the image data in the CPU 32 are executed by the above-mentioned processes. In addition, the CPU 32, when executing the image process, uses the memory 44 as a memory for an image process operation.

Figure 4:
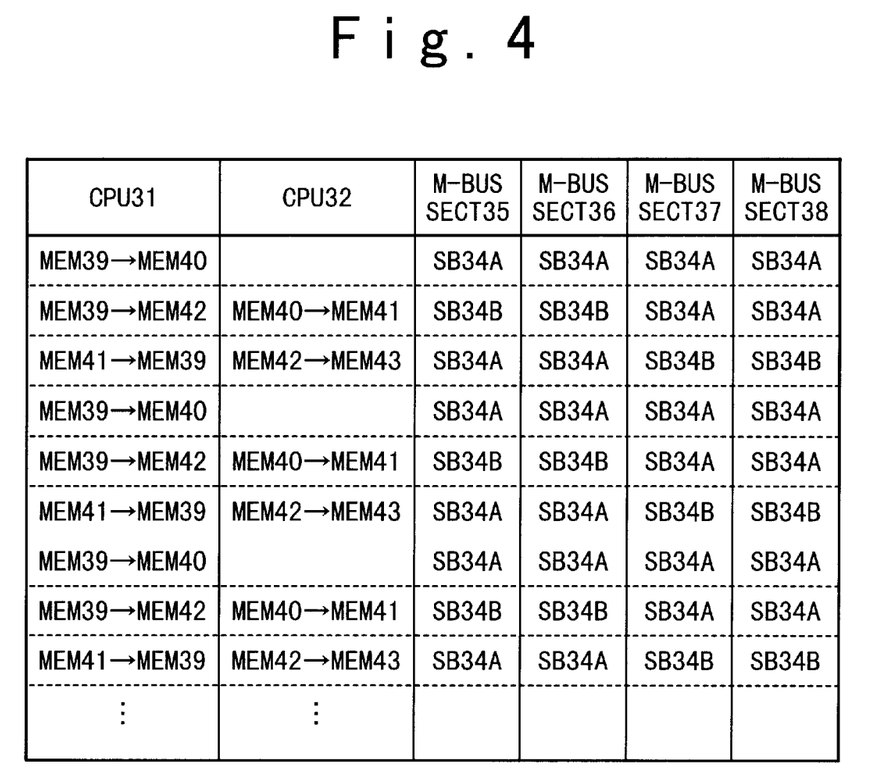
FIG. 4 is a view to explain an operation of a memory bus selector and an example of a flow of an image data, in the data processing apparatus in FIG. 3.

FIG. 4 shows the switching sequence between the memory bus selectors 35 to 38 and the data transfer in the data processing apparatus shown in FIG. 3. As mentioned above, the image process is executed by switching the data to be image-processed, into the system bus 34B connected to the CPU 32. Since the CPU 31 and the CPU 32 are controlled in accordance with this sequence, the CPU 31 and the CPU 32 can parallel access the memories without waiting to use the same bus, and then read out and process the data, and further write the data after the process to the memories.

Figure 5:
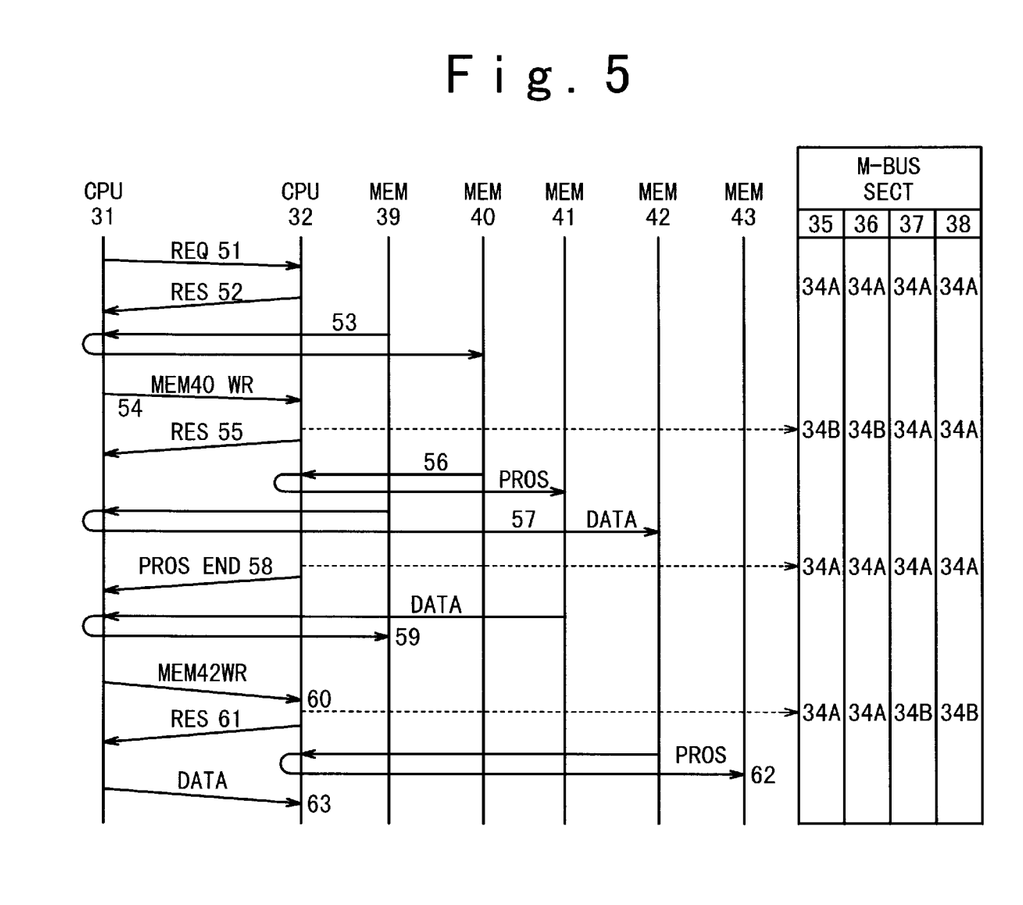
FIG. 5 is a sequence diagram to explain an operation and an example of a flow of data, in the data processing apparatus in FIG. 3.

The flow of the image data described with reference to FIG. 3 will be described below with reference to FIG. 5.

When the image processing is executed, the CPU 31 issues an image process request command 51 to the CPU 32. The CPU 32 transmits a response status 52 back to the CPU 31. The CPU 31 transfers the image data of the memory 39 to the memory 40. When the transfer of the image data to the memory 40 from the memory 39 is completed, the CPU 31 issues a write completion report 54 to the CPU 32. The CPU 32 transmits a response status 55 back to the CPU 31. The CPU 32 sets the connections between the memories 40, 41 and the system bus 34B at the active state. The CPU 32 performs the image processing on the image data read out from the memory 40. The CPU 32 writes the image data after the image process, to the memory 41. The CPU 31 transfers a new image data to the memory 42 from the memory 39, during the image process of the CPU 32. The CPU 32, when the image processing is completed, reports an image process completion report 58 to the CPU 31. The CPU 32 sets the connections between the memories 40, 41 and the system bus 34A at the active state. The CPU 31 transfers the image data after the image process, from the memory 41 to the memory 39. The CPU 31, when the data transfer to the memory 42 is completed, issues a write completion report 60 to the CPU 32. The CPU 32 transmits a response status 61 corresponding to the write completion report 60 to the CPU 31. The CPU 31 sets the connections between the memories 42, 43 and the system bus 34B at the active state. The CPU 32 performs the image processing on the image data stored in the memory 42, and then writes the image data after the image process, to the memory 43.

Figure 6:
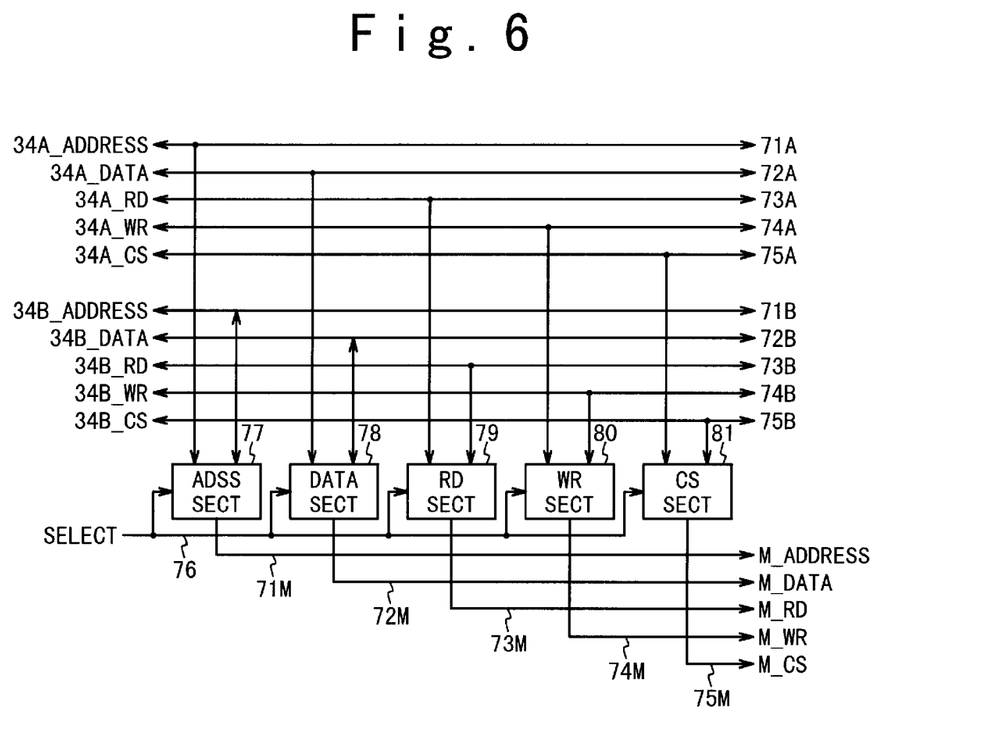
FIG. 6 is a block diagram showing the memory bus selector of the data processing apparatus in FIG. 3.

The operation of the memory bus selector 35 will be described below with reference to FIG. 6.

The memory bus selector 35 is provided with an address selector 77, a data selector 78, an RD signal selector 79, a WR signal selector 80 and a CS (Chip Select) signal selector 81.

The address selector 77 receives a selection signal 76. The address selector 77 is connected to an address bus 71A of the system bus 34A and an address bus 71B of the system bus 343. The address selector 77 is connected to an address bus 71M. The data selector 78 is connected to a data bus 72A of the system bus 34A and a data bus 72B of the system bus 34B. The data selector 78 is connected to a data bus 72M. The RD signal selector 79 is connected to an RD signal bus 73A of the system bus 34A and an RD signal bus 733 of the system bus 343. The RD signal selector 79 is connected to an RD signal bus 73M. The WR signal selector 80 is connected to a WR signal bus 74A of the system bus 34A and a WR signal bus 74B of the system bus 34B. The WR signal selector 80 is connected to a WR signal bus 74M. The CS signal selector 81 is connected to a CS signal bus 75A of the system bus 34A and a CS signal bus 75B of the system bus 34B. The CS signal selector 81 is connected to a CS signal bus 75M. The address bus 71M, the data bus 72M, the RD signal bus 73M, the WR signal bus 74M and the CS signal bus 75M are connected to the memory.

The address selector 77 selects any one of an address of the system bus 34A and an address of the system bus 34B, in accordance with the selection signal 76. The data selector 78 selects any one of a data of the system bus 34A and a data of the system bus 34B, in accordance with the selection signal 76. The RD signal selector 79 selects any one of an RD signal of the system bus 34A and an RD signal of the system bus 343, in accordance with the selection signal 76. The WR signal selector 80 selects any one of a WR signal of the system bus 34A and a WR signal of the system bus 34B, in accordance with the selection signal 76. The CS signal selector 81 selects any one of a CS signal of the system bus 34A and a CS signal of the system bus 34B, in accordance with the selection signal 76.

The address selected by the address selector 77 is outputted to the address bus 71M. The data selected by the data selector 78 is outputted to the data bus 72M. The RD signal selected by the RD signal selector 79 is outputted to the RD signal bus 73M. The WR signal selected by the WR signal selector 80 is outputted to the WR signal bus 74M. The CS signal selected by the CS signal selector 81 is outputted to the CS signal bus 75M. The other memory bus selectors 36 to 38 also have the configuration similar to that of the memory bus selector 35.

In the above-mentioned embodiments, the communication with regard to the access to the memory is executed between the plurality of CPUs and the CPU in the memory control circuit. In the data processing apparatus according to the present invention, the result of the communication is referred to accordingly execute the switching operation between the memory bus selectors, in accordance with the data processing flow.

In the above-mentioned embodiments, the CPU in the memory bus selector recognizes the connection set at the active state, among the connections between the system buses and the memories. The CPU recognizes the access condition (the data processing state) of the memory. In the communication between the CPUs, the data processing state is checked to accordingly execute the access of the further memory (the data processing).

In the above-mentioned embodiments of the present invention, the control circuit may be constituted within the plurality of CPUs. In the above-mentioned embodiments of the present invention, in the communication between the CPUs, a serial interface and a dual port RAM may be used for the communication between the CPUs.

In the present invention, the plurality of CPUs can parallel access the plurality of memories and further execute the data processing. Thus, the occurrence of the bus open waiting state in the CPU can be reduced to thereby improve the entire speed of the data processing.

Also, in the present invention, the plurality of CPUs can carry out the data processing while checking the access condition (data processing state) of the memory. Accordingly, another data processing can be executed prior to the access to the memory. This execution enables the improvement of the entire speed in the data processing.

What is claimed is:

1. A data processing apparatus comprising:

a plurality of processors, each coupled to a corresponding system bus;

a plurality of memories;

a plurality of memory bus selectors, each coupled to a respective one of said plurality of memories, each selector being coupled to each of said system buses and each selector selectively connecting its corresponding memory to one of said system buses to provide an access route for transfer of data between its corresponding memory and one of the plurality of processors; and a control unit coupled to each of said selectors for instructing a selector to select one of said system buses.

2. A data processing apparatus as claimed in claim 1, wherein the control unit includes a parallel input-output unit connected to the plurality of processors such that transfer requests are supplied from respective processors to the control unit in parallel.

3. A data processing apparatus as claimed in claim 1, wherein the control unit includes a serial interface unit receiving transfer requests from the plurality of processors in serial.

4. A data processing apparatus as claimed in claim 1, wherein the control unit includes a dual-port RAM receiving transfer requests from the plurality of processors in parallel.

5. A data processing apparatus as claimed in claim 1, wherein the control unit provides an instruction to one of the plurality of memory bus selectors in response to a transfer request from a processor requesting transfer of data using a memory corresponding to the one of the selectors.

6. The data processing apparatus claimed in claim 1, wherein said control unit comprises one of said plurality of processors.

7. A data processing apparatus comprising:

first and second system buses;

a processor connected to the first system bus;

a memory control unit connected to the processor;

a plurality of memories;

a plurality of memory bus selectors, each selector being coupled to a respective one of the plurality of memories, and each selector being coupled to each of the first and second system buses, each selector connecting its corresponding memory to one of the first and second system buses in response to an instruction;

wherein a memory control unit generates a first instruction to a first one of the memory bus selectors in response to a first request from the processor such that the first memory bus selector selects the first system bus to allow the processor to access a memory coupled to the first memory bus selector, and wherein the memory control unit generates second and third instructions to respective second and third memory bus selectors in response to second and third requests from the processor, such that the memory control unit causes data to be read from a second memory via the second memory bus selector and stored in a third memory via the third memory bus selector.

8. A data processing apparatus as claimed in claim 7, wherein the memory control unit includes a parallel input-output unit connected to the processor such that transfer requests are supplied from the processor to the control unit in parallel.

9. A data processing apparatus as claimed in claim 7, wherein the control unit includes a serial interface unit receiving transfer requests from the processor in serial.

10. A data processing apparatus as claimed in claim 7, wherein the control unit includes a dual-port RAM receiving transfer requests from the processor in parallel.

11. A data processing apparatus as claimed in claim 7, further comprising a buffer, wherein the memory control unit generates the second and third instructions such that the memory control unit transfers data from the second memory to the buffer via the second memory bus selector and the memory control unit transfers the data from the buffer to the third memory via the third memory bus selector.

12. A data processing apparatus as claimed in claim 11, wherein the control unit includes a parallel input-output unit connected to the processor such that transfer requests are supplied from the processor to the control unit in parallel.

13. A data processing apparatus as claimed in claim 11, wherein the control unit includes a serial interface unit receiving transfer requests from the processor in serial.

14. A data processing apparatus as claimed in claim 11, wherein the control unit includes a dual-port RAM receiving transfer requests from the processor in parallel.

15. A method of accessing a plurality of memories in a system comprising a plurality of processors each coupled to corresponding respective system buses, and a plurality of memory bus selectors each coupled to all of said system buses and each further coupled to a corresponding memory, the method comprising:

receiving in a control unit a request from one of said processors for connection of the one of said processors to one of said memories;

providing from the control unit a control signal to one of said memory bus selectors indicating a system bus to be selected, the system bus corresponding to the one of said processors and the one of said memory bus selectors corresponding to the one of said memories;

in said one of said memory bus selectors, selecting a system bus in accordance with said control signal so as to provide an access route between the one of said processors coupled to said system bus and the one of said memories coupled to said one of said memory bus selectors; and transferring data between the one of said processors coupled to said system bus and the one of said memories coupled to said one of said memory bus selectors.

\* \* \* \* \*